US010178746B2

(12) United States Patent

Yadav et al.

(10) Patent No.: US 10,178,746 B2

(45) Date of Patent: *Jan. 8, 2019

(54) CONFIGURABLE LIGHTING SYSTEM

(71) Applicant: Hubbell Incorporated, Shelton, CT (US)

(72) Inventors: Pritam Yadav, Greenville, SC (US); Chris Bailey, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,027

(22) Filed: May 4, 2018

(65) Prior Publication Data

US 2018/0255628 A1 Sep. 6, 2018

Related U.S. Application Data

(63) Continuation of application No. 15/439,400, filed on Feb. 22, 2017, now Pat. No. 9,986,625.

(Continued)

(51) Int. Cl.

*H05B 37/00* (2006.01)
*H05B 37/02* (2006.01)
*H05B 33/08* (2006.01)

(52) U.S. Cl.

CPC ..... *H05B 37/0281* (2013.01); *H05B 33/0872* (2013.01); *H05B 37/0272* (2013.01); *Y02B 20/42* (2013.01)

(58) Field of Classification Search

CPC ............ H05B 33/0815; H05B 33/0818; H05B 41/2828; H05B 41/3921; H05B 41/3927;

(Continued)

(56) References Cited

U.S. PATENT DOCUMENTS 8,324,808 B2 12/2012 Maxik et al.
8,836,243 B2 9/2014 Eisele et al.

(Continued)

FOREIGN PATENT DOCUMENTS

WO WO2015/063644 A1 5/2015
WO WO/2015/184019 12/2015

OTHER PUBLICATIONS

PCT International Search Report for corresponding PCT Application No. PCT/US2017/018827, dated May 5, 2017—2 pages.

(Continued)

*Primary Examiner* — Minh D A

(74) *Attorney, Agent, or Firm* — Dority & Manning, P.A.

(57) ABSTRACT

Apparatus, systems, and methods for controlling light output in a lighting system based on defined light profiles are provided. In one example implementation, a light fixture can include a first light emitting diode (LED) array having one or more LED light sources and a second LED array having one or more LED light sources. The light fixture can include a power circuit configured to provide power to the first LED array and the second LED array according to a power distribution among the first LED array and the second LED array. The light fixture can include one or more control devices configured to control the power circuit to adjust the power distribution among the first LED array and the second LED array based at least in part on a signal indicative of a real time clock and a defined light profile associated with a user identified to be present in a space illuminated by the light fixture.

19 Claims, 5 Drawing Sheets

50
110
110
100
100
100
60
220
200
210

Related U.S. Application Data

(60) Provisional application No. 62/298,193, filed on Feb. 22, 2016.

(58) Field of Classification Search
CPC .. H05B 37/029; H05B 37/02; H05B 37/0254; H05B 33/0857; H05B 33/0863; H05B 41/42; H05B 33/0827; H05B 33/0851; H05B 41/28; H05B 33/0803; F21W 2131/406; G05B 19/14
See application file for complete search history.

(56) References Cited

U.S. PATENT DOCUMENTS

| | | | | |
|---|---|---|---|---|
| 9,986,625 | B2 * | 5/2018 | Yadav | H05B 37/0281 |
| 2010/0118218 | A1 | 5/2010 | Eichenlaub | |
| 2012/0026726 | A1 | 2/2012 | Recker | |
| 2012/0081009 | A1 * | 4/2012 | Shteynberg | H05B 33/083<br>315/122 |
| 2013/0063042 | A1 | 3/2013 | Bora et al. | |
| 2013/0179110 | A1 | 7/2013 | Lee | |
| 2013/0264943 | A1 | 10/2013 | Bora | |
| 2013/0270998 | A1 | 10/2013 | Pi | |
| 2013/0308336 | A1 | 11/2013 | Vissenberg et al. | |
| 2014/0062297 | A1 | 3/2014 | Bora | |
| 2015/0351205 | A1 | 12/2015 | Clark | |

OTHER PUBLICATIONS

PCT International Preliminary Report on Patentability for corresponding PCT Application No. PCT/US2017/018827, dated Sep. 7, 2018—11 pages.

* cited by examiner

TO LED ARRAYS
400
402
404
405
406
408
410
412
414
415
416
420
425
430
440
TO NETWORK

CONFIGURABLE LIGHTING SYSTEM

PRIORITY CLAIM

The present application is a continuation of U.S. application Ser. No. 15/439,400, filed on Feb. 22, 2017, titled "Configurable Lighting System," which claims the benefit of priority to U.S. Provisional Application Ser. No. 62/298,193, filed on Feb. 22, 2016, titled "Configurable Lighting System for Circadian Entrainment," which is incorporated herein by reference.

FIELD

The present disclosure relates generally to lighting systems.

BACKGROUND

Living organisms have been shown to exhibit circadian rhythms that provide for built in natural biological processes and behaviors. The circadian rhythm of a living organism can be influenced by many variables, including exposure to light (e.g., sunlight), such as a day/night cycle. For instance, exposure to light during the course of a 24 hour day to night period can entrain an asynchronous circadian rhythm of a living organism to the 24 hour period. Disruptions in exposure to typical light patterns during a day/night cycle can lead to disruption in the circadian rhythm. Exposure to light from artificial light sources throughout the day may have an effect on the circadian rhythm of any living organism. For instance, providing daily patterns of varying degrees in illumination throughout the day (e.g., varying intensity and/or color temperature) can be shown to positively support a more natural circadian cycle, and to provide a degree of "normality" and a physiological basis of time to an otherwise abnormal illuminated environment.

Different light sources may exhibit different spectral power distributions in illumination of light and as such may provide varying degrees of circadian entrainment. The spectral power distribution of a light source can demonstrate the radiant power emitted by the light source at each wavelength (e.g., color) over the visible electromagnetic radiation spectrum. The spectral power distribution of incandescent light sources, fluorescent light sources, metal halide light sources, etc. is mostly static and can provide limited flexibility in spectral power distribution. These sources can vary greatly from natural light found in the natural world under normal circumstances.

Light emitting diode (LED) lighting systems can include one or more LED devices that become illuminated as a result of the movement of electrons through a semiconductor material. LED devices are becoming increasingly used in many lighting applications and have been integrated into a variety of products, such as light fixtures, flashlights, and other illumination products. LED lighting systems can provide increased efficiency, life and durability, can produce less heat, and can provide other advantages relative to traditional incandescent and fluorescent lighting systems. Moreover, the efficiency of LED lighting systems has increased such that the same or similar light output can be provided at lower operational cost to the consumer in comparison to legacy light sources.

LED devices can provide greater flexibility in providing illumination with a desired spectral power distribution relative to other light sources, such as incandescent, fluorescent, and other legacy light sources. More particularly, LED devices can be provided in a range of different monochromatic colors and/or color temperatures. The color temperature of an LED device refers to the absolute temperature of a black body radiator having a chromaticity equal to that of the LED device. LED devices associated with higher color temperatures can provide a more bluish color while LED devices associated with lower color temperatures can provide a more yellowish color.

SUMMARY

Aspects and advantages of embodiments of the present disclosure will be set forth in part in the following description, or may be learned from the description, or may be learned through practice of the embodiments.

One example aspect of the present disclosure is directed to a light fixture. The light fixture can include a first light emitting diode (LED) array having one or more LED light sources. The light fixture can include a second LED array having or more LED light sources. The light fixture can include a power circuit configured to provider to the first LED array and the second LED array according to a power distribution among the first LED array and the second LED array. The light fixture can include one or more control devices. The one or more control devices can be configured to control the power circuit to adjust the power distribution among the first LED array and the second LED array based at least in part on a signal indicative of a real time clock and a defined light profile associated with a user presence in or near a space illuminated by the light fixture.

Another example aspect of the present disclosure is directed to a method of controlling the light output of a light fixture. The method includes determining, by one or more control devices, the presence of one or more users in or near a space illuminated by the light fixture. The method includes obtaining, by the one or more control devices, data associated with a defined light profile associated with each of the one or more users determined to be in the space illuminated by the light fixture. The method includes determining, by the one or more control devices, one or more parameters of a light output from the light fixture based at least in part on the data associated with the defined light profile for each of the one or more users. The method includes adjusting, by the one or more control devices, a power distribution among the plurality of light sources in the light fixture based at least in part on the one or more parameters of the light output.

Another example aspect of the present disclosure is directed to a circuit for powering a plurality of light emitting diode (LED) arrays associated with a light fixture. The circuit can include a power circuit. The circuit can include a communication interface. The circuit can include a control device operable to perform operations. The operations can include: obtaining a defined light profile associated with a user in or near the space via the communication interface; obtaining a signal indicative of a real time clock; determining from the defined light profile a color temperature and an intensity of a light output based at least in part on the signal indicative of the real time clock; and sending a control signal to the power circuit to control a power distribution among the plurality of LED arrays based at least in part on the determined color temperature and intensity of the light output.

Other example aspects of the present disclosure are directed to lighting systems, light engines, lighting circuits, light fixtures, devices, methods, and apparatus for controlling the output of light according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
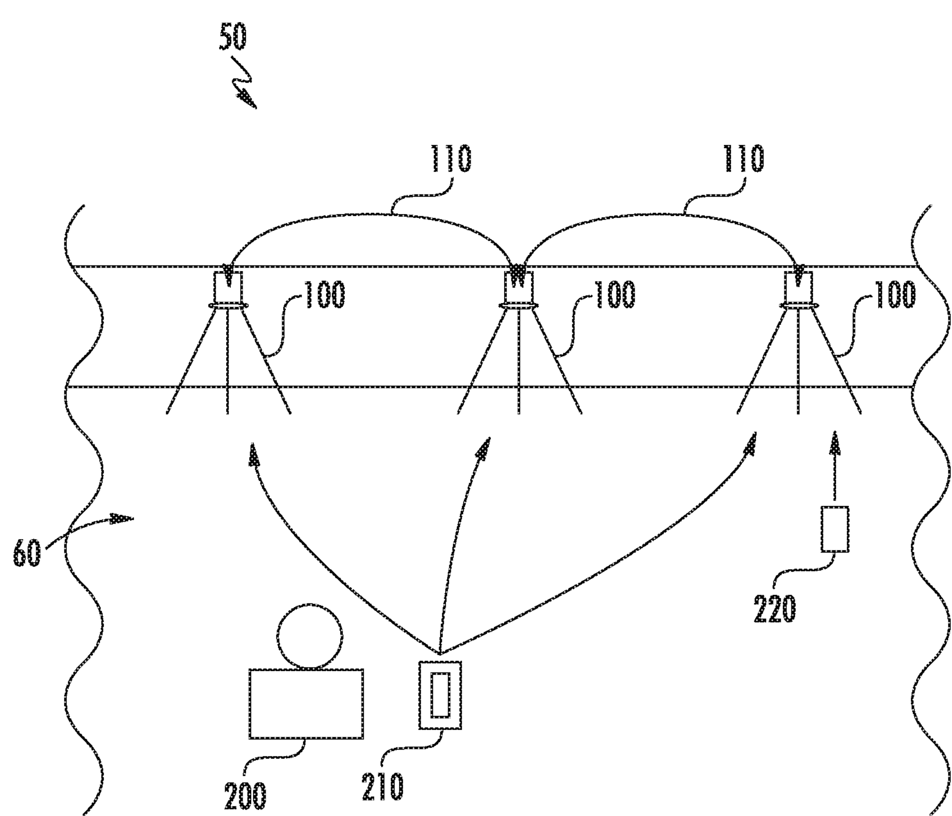
FIG. 1 depicts an overview of example lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to lighting systems that can be configured to provide light output, for instance, according to a defined light profile over the course of a day-to-night period. In some embodiments, the use of LED light sources can provide for enhanced flexibility in tailoring and/or adjusting light output characteristics (e.g., color temperature, intensity, spectral power distribution) to particular desired levels over time using a defined light profile. For instance, in some embodiments, the lighting system can provide a light output that is based at least in part on a circadian rhythm of a living organism exposed to the light source, such as a person, vegetation, and other living organisms. For instance, the light output can be adjusted over time to entrain a circadian rhythm of a living organism exposed to the light source. In some embodiments, the defined light profile can specify an adjustment of the light output over time to generally follow a natural light cycle of at least a portion of the day-to-night period. In other embodiments, the light output can follow a defined light profile designed to influence productivity or health and/or designed based on user preferences, settings, or other information (e.g. human centric information, user calendar data, etc.).

More particularly, in some embodiments, the light fixture can include one or more light sources, such as a plurality of light emitting diode (LED) arrays (e.g., two or more LED arrays). Each of the LED arrays can include one or more LED devices that are configured to emit light as a result of movement of electrons through a semiconductor material. Each of the LED arrays can be associated with a different color temperature, different intensity, different monochromatic color (e.g., narrow banded colors) or other suitable characteristics. Power distribution among the plurality of LED arrays can be controlled to provide a light output at a desired intensity and/or color temperature.

For instance, the light fixture can include a first LED array associated with a first color temperature (e.g., in the range of about 2500 K to about 3000 K) and a second LED array associated with a second color temperature (e.g., in the range of about 5000 K to about 6500 K). While the present disclosure is discussed with reference to a fixture having a plurality of LED arrays associated with different color temperatures, those of ordinary skill in the art, using the disclosures provided herein will understand that other suitable light sources and/or combinations of light sources of varying color temperature, intensity, monochromatic light, etc. can be used without deviating from the scope of the present disclosure. For example, in some embodiments, the light sources can include a plurality of LED arrays including white LEDs associated with a specific color temperature and narrow banded LED associated with, for instance, a blue color. Other combinations of LEDs are contemplated by the present disclosure.

The light fixture can include a power circuit (e.g., a multichannel driver circuit, current splitter circuit, current balancing circuit, etc.) that can be controlled to provide varying power distributions (e.g., ratio of driving currents) to each of the plurality of LED arrays to control the color temperature and/or intensity of the collective light output of the lighting system. For instance, the power circuit can be configured to provide power to the plurality of LED arrays in accordance with a desired power distribution among the plurality of LED arrays to provide a collective light output at a particular color temperature and/or intensity. For instance, the power circuit can provide a higher driving current to a first LED array associated with a higher color temperature relative to the driving current provided to a second LED array associated with lower color temperature to provide a more bluish collective light output. Similarly, the power circuit can provide a lower driving current to the first LED array associated with a higher color temperature relative to the driving current to the second LED array associated with lower color temperature to provide a more yellowish collective light output.

According to particular aspects of the present disclosure, the light fixture can include one or more control devices (e.g., one or more processors, microcontrollers, application specific integrated circuits, etc.) that are configured to control the power circuit to adjust the power distribution among the plurality of LED arrays to provide a desired collective light output. In some embodiments, the control device(s) can be configured to adjust the collective light output based at least in part on a control signal (e.g., a 0-10 V control signal, DALI control signal, DMX control signal) received at the control device over, for instance, a communication interface (e.g., via a network, interface, electrical communication medium, wireless communication medium, visual communication medium, optical communication medium, or other communication medium). In some embodiments, the control device(s) can include devices located remotely from the light fixture that can communicate with the fixture over, for instance, the communication interface.

In some embodiments, the light fixture can include means for controlling a power distribution among the plurality of LED arrays based on a signal indicative of a real time clock so that a collective output of the plurality of LED arrays is adjusted over time. Example means for controlling a power distribution among the plurality of LED arrays are discussed in more detail below.

More particularly, the control device(s) can control the power circuit to adjust the power distribution among the plurality of LED arrays to adjust the collective light output of the LED arrays in accordance with the defined light profile based on a signal indicative of a real time clock. For instance, the control device(s) can control the power circuit to provide a power distribution among the plurality of LED arrays such that the collective light output of the LED arrays is at a desired intensity and/or color temperature for the particular time of the day-to-night period as indicated by the signal indicative of the real time clock. The signal indicative of the real time clock can indicate the time at a particular geographic area during a day-to-night period (e.g., a 24 hour period). The control device(s) can access a signal indicative of a real time clock from an internal source or from one or more remote devices via a communication interface.

As one example, the light output of the lighting system can be adjusted over time in accordance with a designed light profile such that the light simulates the color temperature change of natural light over the course of at least a portion of a day-to-night cycle. As a result, a living thing exposed to the light output of the lighting system can be exposed to artificial light that can simulate or follow at least a portion the natural light cycle of a day-to-night period. For instance, the defined light profile can specify a decrease in the color temperature of the collective light output over time to simulate the natural light cycle over the course of a portion of a day-to-night period. More particularly, the one or more control devices can control the power distribution of the LED arrays to provide a collective light output associated with a higher color temperature (e.g., in the range of about 5000K to about 6500 K) when the signal indicative of the real time clock indicates a real time associated with a morning portion of a day-to-night period. The one or more control devices can control the power distribution to decrease the color temperature over the course of the day-to-night period such that the collective light output is associated with a lower color temperature (e.g., in the range of about 2500 K to about 3000 K) when the signal indicative of the real time clock indicates a real time associated with a late afternoon portion of a day-to-night period.

The above defined light profile is provided for purposes of illustration and discussion. Other suitable defined light profiles can be used without deviating from the scope of the present disclosure.

For example, defined light profiles can be selected based on human centric parameters, for instance, to enhance user health and/or user productivity. As one example, the defined light profiles can be based on user information, such as user settings, user preferences, and health data or information associated with the user. In embodiments where the defined light profiles are based on user data, the user may be provided with the option to consent to use of such data and have the option to control how the data is used.

In some embodiments, the light fixture can include a communication interface for communicating data and other signals (e.g., control signals and other information) with remote devices and/or other light fixtures over, for instance, a network or other communication medium (e.g., an optical communication medium). The communication interface can include communication circuits, chips, antennas, ports, transmission lines, pins, and other components for communicating information to and/or from the light fixture. The communication interface can be configured to communicate information using a variety of wired or wireless communication mediums using any suitable protocol (e.g., digital line transmission (DLT), Bluetooth low energy (BLE), IEEE 802.11, power over Ethernet, visual light communication (VLC), etc.). In some embodiments, the communication interface can receive information over a network (e.g., a local area network, home area network, a wide area network, the Internet, or other suitable network). In some embodiments, the communication interface can receive information from a remote control device using, for instance, optical signals or other signals. For example, in one implementation, a user can communicate with the light fixture with a hand held remote device using an infrared signal.

In some embodiments, the light fixture can communicate with other light fixtures in a space (e.g., a room) via the communication interface to establish a network of light fixtures (e.g., a star network, ring network, mesh network, daisy chain network, communication bus, or other suitable network and/or configuration) for communicating information among the light fixtures and/or remote devices to provide, for instance a collaborative platform. The light fixtures in a space can communicate with each other, for instance, so that the light fixtures are controlled to provide illumination in the space according to a defined light profile for the space.

For instance, in some implementations, the light fixtures can be operated synchronously such that each light fixture in the space provides a light output with similar characteristics (e.g., similar intensity and/or color temperature). In some implementations, the light fixtures can be operated differently (e.g., with different intensities and/or color temperatures) to provide desired lighting effects for the space.

The light fixture can also be configured to communicate with various user devices (e.g., one or more smartphones, tablets, laptops, desktops, displays with one or more processors, wearable devices, fitness watches, smart watches, heart rate monitors, key FOB devices, other personal devices, etc.) and/or other devices (e.g., one or more smart thermostats, hazard monitoring systems, security systems, etc.) via the communication interface. In some embodiments, the light fixture can access defined light profiles from the user device(s) or other device(s). For instance, a user can program or select a defined light profile for a space. The defined light profile can be communicated to the light fixture for use by the control device(s) in controlling the light output of the light fixture. The defined light profile can be communicated to other light fixtures in the space so that the other light fixtures are also controlled to provide the desired light profile.

In some embodiments, the light fixture can be configured to control the collective light output provided by the light fixture based on a signal indicative of the presence of particular users in or near a space received from the user devices. For example, the light fixture can be configured to detect the presence of a first user in a room based on one or more signals received from one or more user devices associated with first user. Other signals indicative of user presence (e.g., signals from sensors, key FOB readers, cameras, imaging equipment, thermal equipment, security equipment, etc.) can be used without deviating from the scope of the present disclosure. The light fixture can control the light output of the fixture in accordance with a defined light profile associated with the first user. When the light fixture detects the presence of a second user that is different from the first user in the space (e.g., based on signals from one or more user device associated with the second user), the light fixture can control the light output of the fixture in accordance with a defined light profile associated with the second user.

When the light fixture detects the presence of a plurality of different users in or near the space, the light fixture can control the light output of the fixture based on priority given to the plurality of users. For instance, if a first user has priority over a second user, the light fixture can control the light output of the fixture in accordance with a defined light profile associated with the first user. In some embodiments, the light fixture can control the light output of the fixture to harmonize the light output for the plurality of users detected in the space. For instance, when multiple users are detected in a space, the light fixture can be controlled based on a combined and/or blended defined light profile determined based at least in part on the light profile associated with each user. For instance, weights can be assigned to the defined light profile of each user and the combined light profile for the plurality of users can be determined based at least in part on the weights (e.g., using a weighted average or other model) of the defined light profiles associated with each user.

In some embodiments, the defined light profile associated with a user can be selected, designed, and/or adjusted based on data associated with the user, such as health data, sleep data, fitness data, etc. For instance, the defined light profile for a user can be adjusted based on a heart rate of a user as determined, for example, by a fitness tracker associated with the user. In some embodiments, the defined light profile for a user can be adjusted based at least in part on sleep patterns associated with the user as determined, for instance, by a fitness tracker or sleep monitor.

In some embodiments, the defined light profile for a user can be based on calendar data associated with a user. The calendar data can specify various tasks and/or events for the users over time. The defined light profile can specify different light output (e.g., different color temperature and/or intensity) at various times during the day based on the different tasks and/or events in the user's calendar. For instance, a first light output can be provided if a user's calendar indicates that a meeting is to be held in a space where the user is to be present during a particular time of day. A second light output can be provided for the space for other times during the day (e.g., for different tasks such as reading, writing, drawing, etc.).

The light fixture can receive other signals from remote devices over the network. For instance, the light fixture can receive a signal indicative of a real time clock for use in controlling the light output of the light fixture according to the defined light profile over the day-to-night period. In addition, a user can set or program predefined light recipes using a user device (e.g., smartphone, tablet, wearable device, etc.). The light recipes can specify specific light conditions for various events and/or circumstances. For instance, a light recipe can specify a light output at full intensity with high color temperature for certain conditions. A user can request implementation of the light recipe by sending a request to operate the light fixture in accordance with the light recipe from a user device to the fixture via the communication interface.

In some embodiments, the light fixture can receive signals from various sensors (e.g., via the communication interface) and the control device(s) can control the collective light output of the light fixture based on the signals from the one or more sensors. For instance, a signal from a motion sensor (e.g., as part of a hazard monitoring system, security system, or other system) can be communicated to the light fixture over a network via the communication interface. The light fixture can be operated based on the signal from the motion sensor. For instance, if signals from the motion sensor indicate that there is low occupancy in a space, the light fixture can be switched off or operated in a power saving mode. If signals from the motion sensor indicate occupancy in the space, the light fixture can be operated based at least in part on a defined light profile according to example aspects of the present disclosure.

In some embodiments, the light fixture can receive signals from an optical sensor (e.g., via the communication interface). The optical sensor can be configured to sense optical characteristics of the light output by the fixture. For instance, the optical sensor can be configured to detect the intensity and/or color temperature of the light in a space. The control device(s) can be configured to operate the light fixture based on the signals received from the optical sensor. For instance, the defined light profile can specify a desired color temperature of the light in a space at a particular time of a day-to-night period. The optical sensor can detect the actual color temperature of the light in the space. The actual color temperature can result from the light output of the light fixture as well as other light sources, both artificial and natural, in the space. The control device(s) of the light fixture can be configured to adjust the color temperature of the light output of the light fixture so that the collective color temperature of the light in the space is close to the color temperature specified by the defined light profile.

In some embodiments, the light fixture can be configured to provide a light output at a specific pattern and/or modulation rate (e.g., turned on and off at a particular frequency and/or pattern). The specific pattern may not be visible to a user but can be detected, for instance, by an optical device (e.g., a camera and/or photodiode). A user device can use one or more optical devices (e.g., cameras) to detect the pattern of the light output. Upon detection of the specific pattern, a user device can recognize that the device is in proximity to a particular light fixture associated with the specific pattern and can send control signals to the light fixture over, for instance, a communication interface associated with the light fixture. For instance, the user device can provide a defined light profile to the fixture in response to detecting the specific light fixture.

As used herein, a "lighting system" can include, but is not limited to, one or more of a lighting circuit, light engine, one or more light fixtures (i.e., luminaires), a plurality of lighting devices arranged in a space, a combination of any of the foregoing, or other system used to provide illumination. A "light fixture" or "luminaire" refers to a device used to provide light or illumination using one or more light sources. A "day-to-night" period refers to any period that transitions from day to night. A day-to-night period can include a 24-hour period. A portion of a day-to-night period can include any subset of the period, whether or not the subset includes an actual transition from day to night or night to day. The term "about" or "approximately" when used in conjunction with a numerical value refers to within 25% of the stated numerical value. A user can be "near" a space, for instance, when the user is at a location adjacent or otherwise proximate the space such that the user can enter the space (e.g., walk into the space) in a time period about five minutes or less.

Aspects of the present disclosure can provide a number of technical effects and benefits. For instance, a lighting system can be configured to accommodate different defined light profiles for different users depending on the users that are present in a space illuminated by the lighting system. The different light profiles for each of the different users can be tailored based on various user characteristics, such as circadian entrainment for the user, health data for the user, user settings, user preferences, user calendar data, and other information. The lighting system can be configured to automatically adjust throughout the day depending on the presence of various users and time of day.

The example technical effects and benefits discussed above can be provided by a light fixture according to example embodiments of the present disclosure. For instance, in some embodiments, the light fixture can include a first light emitting diode (LED) array having one or more LED light sources. The light fixture can include a second LED array having or more LED light sources. The light fixture can include a power circuit configured to provider to the first LED array and the second LED array according to a power distribution among the first LED array and the second LED array. The light fixture can include one or more control devices. The one or more control devices can be configured to control the power circuit to adjust the power distribution among the first LED array and the second LED array based at least in part on a signal indicative of a real time clock and a defined light profile associated with a user identified to be present in a space illuminated by the light fixture.

In some embodiments, the first LED array can be associated with a first color temperature and the second LED array can be associated with a second color temperature that is different from the first color temperature. The power circuit can be a multichannel driver or can include a current splitter circuit configured to control a current ratio of driver current among the first and second LED array.

In some embodiments, the defined light profile can be obtained from a user device used by the user in the space. The user device can be, for instance, a smartphone, tablet, or wearable device (e.g., watch, fitness tracker, heart rate monitor).

In some embodiments, the defined light profile is obtained (e.g., from a remote server over a communication interface) in response to one or more signals associated with the presence of a user in or near the space. The signals can include, for instance, signals from a motion sensor. The signals can include audio signals (e.g., using voice recognition) spoken by the users. The signals can include signals associated with a motion of a user identified using a motion model correlating motion with individual users. In some embodiments, the motion model can be developed, for instance, using machine learning. Other signals can be used without deviating from the scope of the present disclosure. For instance, a signal associated with a key FOB reader or other security device can indicate the presence of a particular user. As one example, a user can unlock a room, house, or other space using a key or digital device. Unlocking the room or space can provide a signal indicative of user presence in or near the space. As another example, imagery captured by one or more cameras viewing the space or a region near the space can be processed to identify a user. Predictive user patterns can be used to determine the presence of a user in or near the space.

In some embodiments, the defined light profile associated with the user can be a preset defined light profile selected by a user on an application implemented on the user device (e.g., using a graphical user interface). In some embodiments, the defined light profile can be a custom defined light profile. The defined light profile can specify an adjustment in one or more parameters (e.g., color temperature and/or intensity) of a light output of the light fixture as a function of time.

In some embodiments, the defined light profile can specify a decrease in the color temperature of the light output over time from a first color temperature to a second color temperature as the signal indicative of the real time clock transitions from a signal associated with an earlier time in the day-to-night period to a signal associated with a later time in the day-to-night period. The defined light profile can specify an increase in the color temperature of the light output when the signal indicative of the real time clock indicates a transition from a day portion of the day-to-night period to a night portion of the day-to-night period.

In some embodiments, the defined light profile can specify an adjustment in the light output over time based at least in part on calendar data associated with the user. In some embodiments, the defined light profile can specify an adjustment in the light output over time based at least in part on health data (e.g. heart rate data) associated with the user. In some embodiments, the defined light profile can specify an adjustment in the light output over time based at least in part on temperature (e.g., as determined from a thermostat or temperature sensor) associated with the space. In some embodiments, the defined light profile can be based on a circadian rhythm associated with the user.

In some embodiments, the light fixture can be configured to communicate data associated with the defined light profile to one or more remote light fixtures via a communication interface. The light fixture can be arranged in a network of a plurality of light fixtures for communicating information among the light fixtures. The network of light fixtures can be configured to be operated synchronously.

In some embodiments, the signal indicative of the real time clock can be generated by one or more control devices (e.g., after a current time is programmed by a user). In some embodiments, the light fixture can receive the signal indicative of the real time clock from a remove device via a communication interface.

In some embodiments, the one or more control devices can be coupled to a communication interface. The communication interface can be configured to communicate data with one or more remote devices using a communication protocol. The communication protocol can include a digital line transmission protocol, Bluetooth low energy protocol, IEEE 802.11 protocol, or visual line communication protocol.

Example technical effects and benefits can be provided by a method of controlling the light output of a light fixture according to example embodiments of the present disclosure. An example method can include determining, by one or more control devices, the presence of one or more users in or near a space illuminated by the light fixture; obtaining, by one or more control devices, data associated with a defined light profile associated with each of the one or more users (e.g., from a remote device over a communications interface) determined to be in the space illuminated by the light fixture; determining, by the one or more control devices, one or more parameters of a light output from the light fixture based at least in part on the data associated with the defined light profile for each of the one or more users; and adjusting, by the one or more control devices, a power distribution among the a plurality of light sources in the light fixture based at least in part on the one or more parameters of the light output. In some embodiments, the method can include communicating data associated with the power distribution to one or more other light fixtures in the space via a communications interface.

In some embodiments, obtaining, by the one or more control devices, data associated with a defined light profile comprises obtaining data associated with a first defined light profile associated with a first user (e.g., based on a natural light cycle of a day-to-night period) and a second defined light profile associated with a second user (e.g., based on calendar data associated with the second user).

In some embodiments, determining, by the one or more control devices, one or more parameters of a light output can include determining, by the one or more control devices, a priority associated with the first defined light profile and the second defined light profile and determining by the one or more control devices, the one or more parameters based on the priority. In some embodiments, determining, by the one or more control devices, one or more parameters of a light output can include determining, by the one or more control devices a blended light profile based on the first defined light profile and the second defined light profile (e.g., using a weighted average algorithm); and determining, by the one or more control devices, the one or more parameters based on the blended light profile.

Example technical effects and benefits can be provided by a circuit for powering a plurality of LED arrays associated with a light fixture. The circuit can include a power circuit. The circuit can include a communications interface. The circuit can include a control device operable to perform operations. The operations can include obtaining a defined light profile associated with a user in the space via the communication interface; obtaining a signal indicative of a real time clock; determining from the defined light profile a color temperature and an intensity of a light output based at least in part on the signal indicative of the real time clock; and sending a control signal to the power circuit to control a power distribution among the plurality of LED arrays based at least in part on the determined color temperature and intensity of the light output.

In some embodiments, the power circuit can include a multichannel driver. In some embodiments, the power circuit can include a current splitter circuit. In some embodiments, the communications interface can include a communication circuit. The communications circuit can be configured to communicate over a wired or wireless communication medium. The communications circuit can be configured to communicating using a communication protocol. The communication protocol can be, for instance, a digital line transmission protocol, Bluetooth low energy protocol, IEEE 802.11 protocol, or visual line communication protocol.

Example technical effects and benefits can be provided by a light fixture including a first light emitting diode (LED) array having one or more LED light sources; and a second LED array having one or more LED light sources. The second LED array can be with a different color temperature relative to the first LED array. The light fixture can include a power circuit configured to provide power to the first LED array and the second LED array according to a power distribution among the first LED array and the second LED array. The light fixture can include one or more control devices. The one or more control devices can be configured to control the power circuit to adjust the power distribution among the first LED array and the second LED array based at least in part on a signal indicative of a real time clock and a defined light profile defined based at least in part on the circadian rhythm of a user identified to be present in the space illuminated by the light fixture.

With reference now to the Figures, example embodiments of the present disclosure will now be set forth. FIG. 1 depicts an example lighting system 50 according to example embodiments of the present disclosure. As shown, the lighting system 50 includes a plurality of light fixtures 100 arranged in a space 60. Each of the plurality of light fixtures 100 can be any suitable light fixture configured to provide illumination for the space 60. As will be discussed in more detail below, each of the plurality of light fixtures 100 can include one or more control device(s) configured to control the light output of the light fixtures according to a defined light profile. The defined light profile can specify an adjustment of the light output (e.g., color temperature and/or intensity) over time. In some embodiments, the defined light profile can be based at least in part on a natural light cycle of a day-to-night period. In this way, the defined light profile can be based on the circadian rhythm of one or more individuals exposed to light from the light fixtures 100, such as the circadian rhythm of user 200.

More particularly, one or more of the plurality of light fixtures 100 can include control device(s) that can control the light output of one or more of the plurality of light fixtures 100 based on a signal indicative of a real time clock. The control device(s) associated with the light fixtures 100 can access a defined light profile that specifies an adjustment of the light output of the light fixtures 100 over the course of a day-to-night period. The control device(s) can control the light output of the fixture in accordance with the defined light profile depending on the time of the day-to-night period as indicated by the signal indicative of the real time clock.

Figure 2:
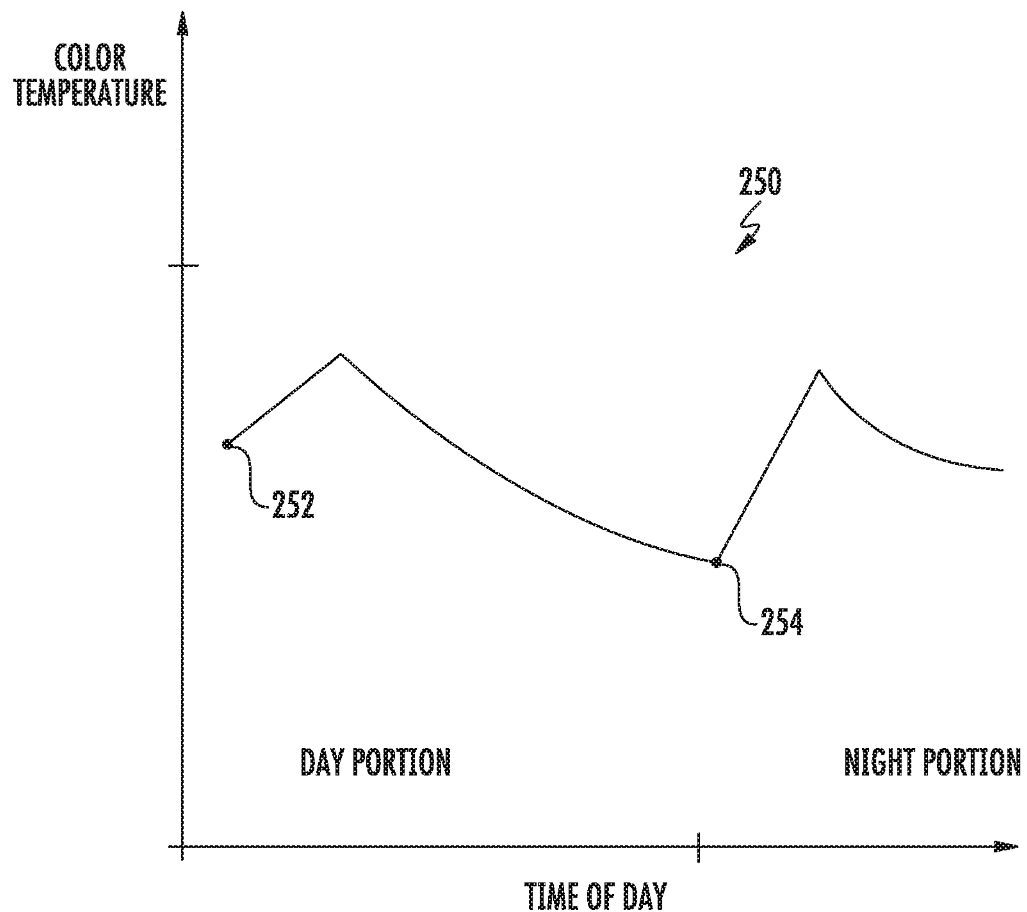
FIG. 2 depicts an example defined light profile according to example embodiments of the present disclosure.

FIG. 2 depicts a graphical representation of one example defined light profile 250 that can be used to control the light output of the light fixtures 100 according to example embodiments of the present disclosure. The graphical representation plots time of day along the horizontal axis and color temperature specified by the defined light profile 250 along the vertical axis. Point 252 on the defined light profile can represent sunrise. As shown, the defined light profile 250 can specify increasing color temperature for a relatively short period following sunrise and then can specify a decreasing color temperature over the course of the day until point 254 on the defined light profile. Point 254 can represent sunset and a transition from a day portion of the day-to-night period to a night portion of the day-to-night period. During the night portion, the defined light profile 250 can specify an increase in color temperature for a relatively short period and then can specify a decreasing color temperature over the course of the night portion of the day-to-night period.

FIG. 2 depicts one example defined light profile 250 based on the natural light cycle of a day-to-night period according to example aspects of the present disclosure. Those of ordinary skill in the art, using the disclosures provided herein, will understand that other suitable defined light profiles can be used without deviating from the scope of the present disclosure.

Referring back to FIG. 1, each of the light fixtures 100 can include a communication interface that allows the fixture to communicate with other light fixtures 100 in the space 60. As shown, the light fixtures 100 can communicate with one another and can establish a communication network 110 among the light fixtures 100. The communication network 110 can have any suitable network configuration, such as a star configuration, a mesh configuration, or other configuration. The communication interface can be configured to communicate information among the plurality of light fixtures using a variety of wired or wireless communication mediums using any suitable protocol (e.g., digital line transmission (DLT), Bluetooth low energy (BLE), IEEE 802.11, power over Ethernet, VLC, etc.)

In some embodiments, the light fixtures 100 can communicate with each other so as to operate synchronously. When operating synchronously, each light fixture can provide a light output with similar characteristics (e.g., similar intensity and color temperature). In other implementations, the light fixtures can be operated differently (e.g., with different intensity and color temperatures) to provide desired lighting effects for the space.

One or more of the light fixtures 100 can also be in communication with a user device 210, such as a smartphone, tablet, wearable device, laptop, desktop, display with one or more processors or other user device 210. The user device 210 can provide an interface for user 200 to interact with the lighting system 50. For instance, the user device 210 can implement an application that provides a graphical user interface on a display of the user device 210 to allow the user to configure the light system 50 (e.g., specify one or more defined light profiles, etc.). The user device 210 can communicate with one or more of the light fixtures 100 over a network. For instance, the user device 210 can communicate directly with one or more light fixtures using, for instance, DLT or BLE communication protocols or other suitable communication protocols. Alternatively and/or in addition, the user device 210 can communicate information over a network (e.g., the Internet) accessible by the light fixtures 100.

One or more of the light fixtures 100 can also be in communication with at least one sensor 220. The sensor 220 can be a motion sensor, optical sensor, or other sensor. The sensor 220 can be, for instance, a standalone sensor or a sensor integrated as part of a separate system (e.g., home monitoring system, hazard monitoring system, HVAC system, etc.). The sensor 220 can communicate directly with one or more light fixtures using, for instance, DLT or BLE communication protocols or other suitable communication protocols. Alternatively and/or in addition, the sensor 220 can communicate information over a network (e.g., the Internet) accessible by the light fixtures 100.

Signals from the sensor 220 can be used by control device(s) associated with the fixtures 100 to control the light output by the light fixtures 100. For example, the sensor 220 can be an optical sensor configured to detect the actual color temperature and/or intensity of the light in the space 60. The control device(s) of the light fixtures 100 can be configured to adjust the color temperature of the light output of the light fixtures 100 so that the collective color temperature of the light in the space 60 is close to the color temperature specified by the defined light profile.

As one example, user 200 can walk into space 60 illuminated by light fixtures 100. The user can be carrying a user device 210, such as a smartphone. The smartphone can implement an application that allows the user to specify or select different defined light profiles. For instance, the user can specify a defined light profile that mimics a natural light cycle of a day-to-night period. Alternatively, the user can specify a defined light profile based on various tasks (e.g., as determined from calendar data associated with the user) to be performed at different times in the space. Alternatively, the user can specify a defined light profile based on user health data that specifies color temperature and/or intensity of light based on user heart rate and time of day. Alternatively, the user can specify a defined light profile based on a temperature of the space and time of day. Alternatively, the user can specify a defined light profiles based on one or more combinations of any of the above example. Various other light profiles can be specified without deviating from the scope of the present disclosure. The defined light profiles can be preset standard profiles or custom defined light profiles.

When the user 200 enters the space 60, a light fixture 100 can detect the presence of the user (e.g., by initiating communications with the user device, or via signals received from a motion sensor 220). The light fixture 100 can receive a defined light profile specified by the user from the user device 210 or other remote device (e.g., a server).

Once received, the light fixture 100 can access a signal indicative of a real time clock and determine one or more parameters (e.g., color temperature and/or intensity) associated with a light output based on the signal indicative of the real time clock and the defined light profile associated with the user 200. The light fixture 100 can provide light in accordance with the one or more parameters. In addition, the light fixture 100 can communicate the defined light profile and/or the one or more parameters to other light fixtures 100 in the space so that the other light fixtures 100 provide a light output in accordance with the defined light profile associated with the user 200.

When the user 200 leaves the room, the light fixtures 100 can continue to provide light in accordance with the defined light profile associated with the user 200 or can provide light output in accordance with a default light profile. When a different user enters the room, the light fixture 100 can obtain data indicative of a different light profile associated with the different user (e.g., from a user device or server) and provide light output in accordance with the different light profile.

If multiple users are in the space 60 at the same time, the light fixture 100 can determine a priority among light profiles for the different users based on a various factors (e.g., primary occupant of the space, health needs, seniority, etc.) and select a light profile among the plurality of light profiles for different users based on the priority. Alternatively, a blended light profile can be determined that blends aspects of the plurality of profiles according to, for instance a weighting scheme.

Figure 3:
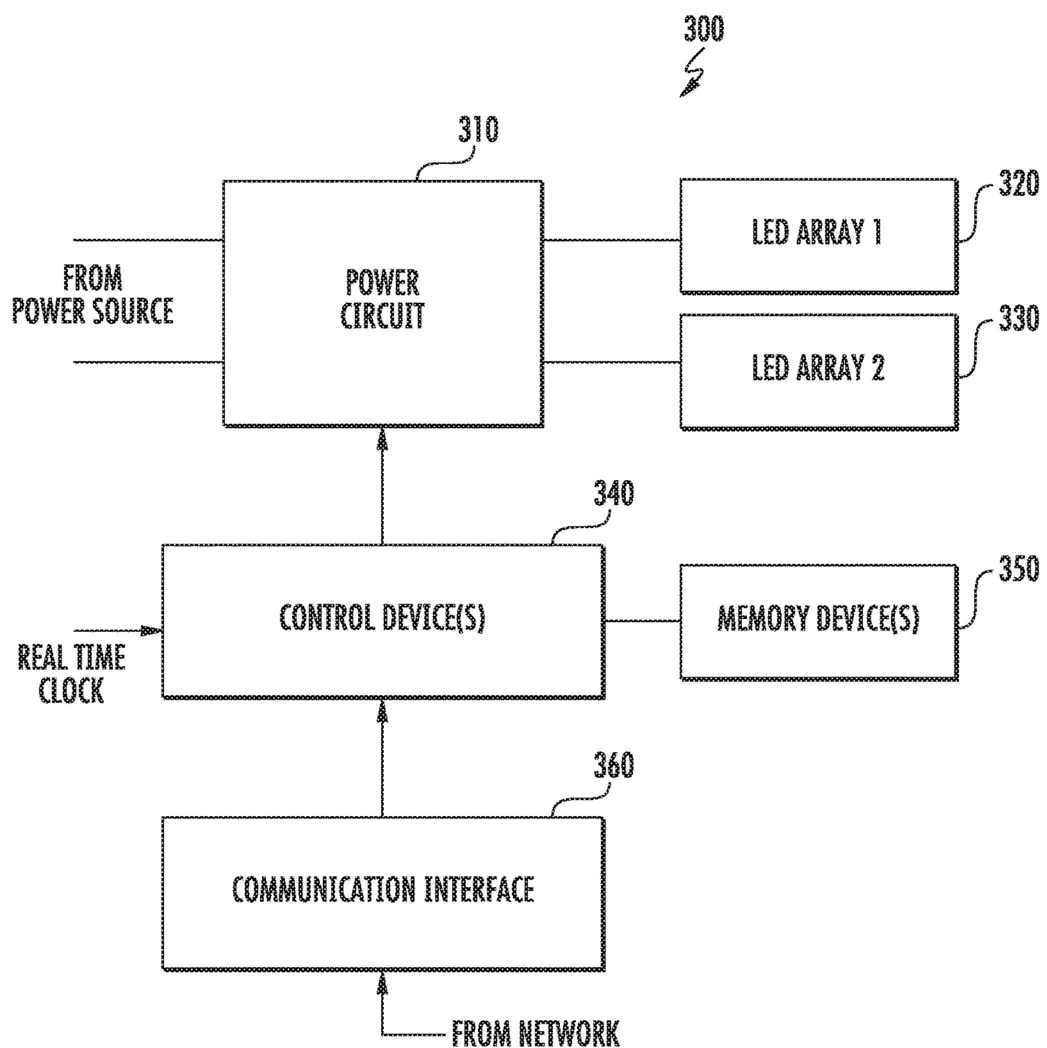
FIG. 3 depicts a schematic of an example light fixture according to example embodiments of the present disclosure.

FIG. 3 depicts a schematic of an example circuit diagram 300 for a light fixture 100 according to example embodiments of the present disclosure. As shown, the light fixture 100 can include a power circuit 310, a first LED array 320 and a second LED array 330. While two LED arrays are illustrated in FIG. 1, those of ordinary skill in the art, using the disclosure provided herein will understand that any number of LED arrays can be used in the light fixture 100 without deviating from the scope of the present disclosure.

Each of the first LED array 320 and the second LED array 330 can include one or more LED devices. The LED devices can emit light (e.g. visible light, ultraviolet light, infrared light, or other light or electromagnetic energy) as a result of electrons moving through a semiconductor material. In particular example implementations, the first LED array 320 can be associated with a different color temperature relative to the second LED array 330. The present disclosure is discussed with reference to LED arrays having different color temperature for purposes of illustration and discussion. The LED arrays can include many other suitable variations without deviating from the scope of the present disclosure. For instance, the LED arrays can be associated with a different brightness, different color, different lighting direction, different layout, or other suitable characteristics. The LED arrays 320 and 330 can be implemented on the same circuit board or on different circuit boards.

The power circuit 310 can be configured to receive an input power from a power source (e.g., an AC or DC power source, power over Ethernet, etc.) and convert the input power to an output power suitable for powering one or more light sources, such as first LED array 320 and second LED array 330. In some embodiments, the power circuit 310 can be configured to provide different driving currents to the first LED array 320 and the second LED array 330. For instance, the power circuit 320 can include one or more of a multi-channel driver circuit, a current splitter circuit, one or more current regulators, and/or other devices that can be used to independently provide a driver current to the first LED array 320 and the second LED array 330.

The light fixture 100 can include means for controlling a power distribution among the first LED array and the second LED array based on a signal indicative of a real time clock so that a collective output of the first LED array and the second LED array is adjusted over time to simulate a color temperature change of a natural light cycle of at least a portion a day-to-night period. For instance, the light fixture 100 can include one or more control device(s) 340. The control device(s) 340 can include, for instance, one or more microcontrollers, microprocessors, logic circuits, ASICs, etc. The control device(s) 340 can send control signals to the power circuit 310 to control the intensity and/or color temperature of the collective light output by the first LED array 320 and the second LED array 330. More particularly, the control device(s) 340 can send control signals to the power circuit 310 to control the power distribution (e.g. driving current) among the plurality of LED arrays 320 and 330 to provide a desired light output by the fixture 100.

The light fixture 100 can include one or more memory devices 350. The memory device(s) 350 can be, for instance, one or more computer-readable media, including, but not limited to, non-transitory computer-readable media, RAM, ROM, flash memory or other memory devices. The memory device(s) 350 can store computer-readable instructions that when executed by the control device(s) 340 cause the control devices(s) 340 to perform operations. For instance, the memory device(s) 350 can store computer-readable instructions that when executed by the one or more control device(s) 340 cause the one or more control device(s) 340 to control the power circuit 310 based on a defined light profile according to example embodiments of the present disclosure. The memory device(s) 350 are illustrated as being separate from the control device(s) 340. However, those of ordinary skill in the art, using the disclosures provided herein, will understand that the memory device(s) 350 can be included as part of the control device(s) 340 without deviating from the scope of the present disclosure.

The light fixture 100 can further include a communication interface 360. The communication interface 360 can include one or more devices used to communicate information from remote devices, such as other light fixtures, user devices, sensors, and other devices. The communication interface 360 can include, for instance, communication circuits, chips, antennas, ports, transmission lines, pins, and other components for communicating information to or from the light fixture 100. The communication interface 360 can be configured to communicate information with one or more remote devices or with one or more networks using wired and/or wireless communication links (e.g., using DLT, BLE, IEEE 802.11, etc.).

According to particular aspect of the present disclosure, the control device(s) 340 can access a signal indicative of a real time clock. The signal indicative of a real time clock can be accessed from a circuit external to the control device(s) 340 and/or can be generated internally by the control device (s) 340. In addition and/or in the alternative, the control device(s) 340 can receive a signal indicative of a real time clock from one or more remote devices via the communication interface 360.

The control device(s) 340 can be configured to control the power circuit 310 to provide a power distribution among the plurality of LED arrays 320 and 330 based at least in part on the signal indicative of the real time clock 345. For instance, the control device(s) 340 can access a defined light profile stored in the memory device(s) 350 and/or accessed from a remote device via the communications interface 360. As discussed above, the defined light profile can specify a varying color temperature and/or intensity of the collective light output provided by the LED arrays 320 and 330 for various different times during a day-to-night period.

The control device(s) 340 can determine the light output specified by the defined light profile at the time indicated by the signal indicative of the real time clock. The control device(s) 340 can then determine a control signal for controlling the power circuit to provide a power distribution among the plurality of LED arrays 320 and 330 to achieve the specified light output. Instructions associated with the required power distribution to achieve various light outputs can also be stored in the memory device(s) 350 or accessed by the control device(s) 340 from a remote device via the communication interface 360. The control signal can be provided to the power circuit 310. The power circuit 310 can then allocate power among the plurality of LED arrays 320 and 330 so that the light fixture 100 provides a collective light output as specified by the defined light profile.

In some embodiments, the power circuit 310 can be a multichannel driver. In some embodiments, the power circuit 310 can include a single channel driver and a current splitter circuit configured to split the output of the single channel driver among the plurality of LED arrays 320 and 330. The control signal can control the current splitter circuit to control the ratio of current provided to the LED array 320 relative to the LED array 330.

Figure 4:
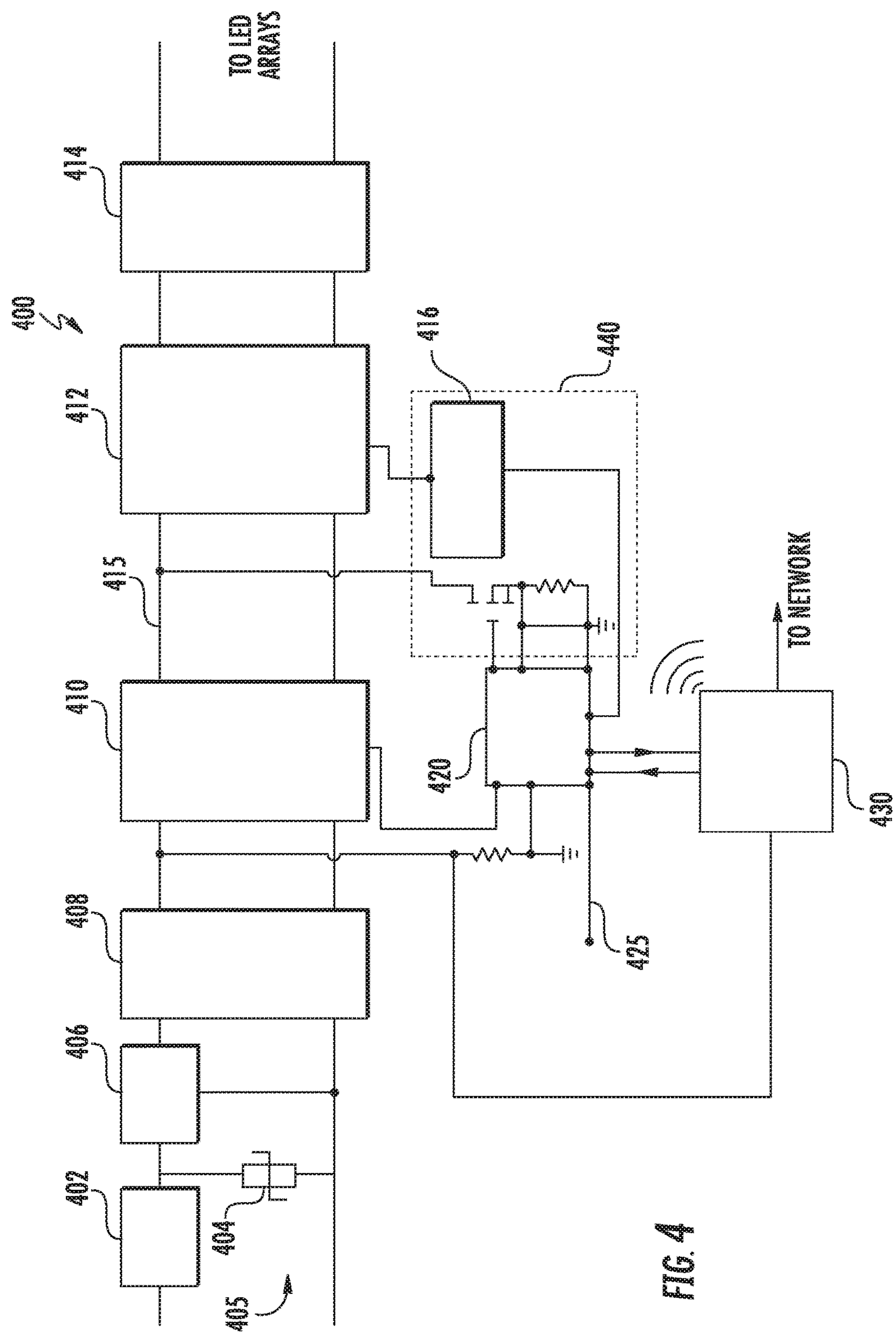
FIG. 4 depicts an example circuit diagram associated with a light fixture according to example embodiments of the present disclosure.

FIG. 4 depicts an example circuit 400 associated with example light fixture that can be used to implement example aspects of the present disclosure. The circuit 400 can be configured to provide and control power distribution to a plurality of LED arrays or other light sources in a light fixture according to example embodiments of the present disclosure. As shown the circuit, includes an input 405 configured to receive an input power from, for instance, an AC power source. A fuse 402 and MOV 404 can be used to provide over current and/or overvoltage protection for the circuit 400. The input 405 can be provided through an EMI line filter 406. A rectifier 408 (e.g., a bridge rectifier) can rectify the input power to a DC power and provide the DC power to a conditioning circuit 410. The conditioning circuit 410 can filter the DC power, provide for power factor correction, and/or provide start up capabilities. The conditioning circuit 410 can provide power to a DC bus 415.

The circuit 400 can include a converter circuit 412 (e.g., a flyback converter) that can be used to convert the power on the DC bus 115 to suitable driving current(s) for driving a plurality of LED arrays. The converter circuit 412 can provide the driving current(s) for driving the plurality of LED arrays through a suitable output filter 414. In some embodiments, the output of circuit 400 can be provided as multi-channel driver output. In some embodiments, the converter circuit 412 can include a current splitter circuit.

The current splitter circuit can split a driver current into a plurality of driver current(s) for the different LED arrays according to a current ratio specified by a control signal received at the current splitter.

As shown, the circuit can include a power management integrated circuit (PMIC) 420 as a control device. The PMIC 420 can be configured to send control signals (e.g., via control interface 416) to control the power distribution (e.g., ratio of driver currents) provided to each of a plurality of LED arrays by the converter circuit 412. For instance, in one embodiment, the control signal can be provided to a current splitter circuit to control a driver current ratio among the plurality of LED arrays. The PMIC 420 can be coupled to a feedback circuit 440 that can measure or sense characteristics of the output power, DC bus, etc. to provide control signals to the converter circuit 412.

The PMIC 420 can receive various sensing inputs. For instance, the PMIC 420 can receive signals indicative of temperature, indicative of a real time clock, etc. via sensor interface 425. The PMIC 420 can be configured to provide a control signals via central interface 416 based at least in part on signals received from the sensor interface 425.

The PMIC 420 can be coupled to a communications circuit 430. The communications circuit 430 can be, for instance, a communications module that allows the PMIC 420 to communicate with remote devices either directly or over a network. The communications circuit 430 can be, for instance, a wireless or wired module configured to provide for wireless communications with remote devices using a variety of protocols (e.g., digital line transmission (DLT), Bluetooth low energy (BLE), IEEE 802.11, visual light communication).

According to example aspects of the present disclosure, the PMIC 420 can receive date from remote devices via the communications circuit 430. For instance, the PMIC can receive data associated with a defined light profile from a user device over communications circuit 430. The defined light profile can specify, for instance, a change in color temperature over the course of a day-to-night period to mimic a natural light cycle. The PMIC 420 can send control signals to the converter circuit 412 to adjust a power distribution among the plurality of LED arrays to achieve the change in color temperature over time as specified by the defined light profile.

In some embodiments, the PMIC 420 can send control signals to the converter circuit 412 based on signals indicative of a real time clock. The real time clock can be internal to the PMIC 420 or elsewhere in the circuit 400. Alternatively, signals associated with a real time clock can be received from a remote device via communications interface 430.

Figure 5:
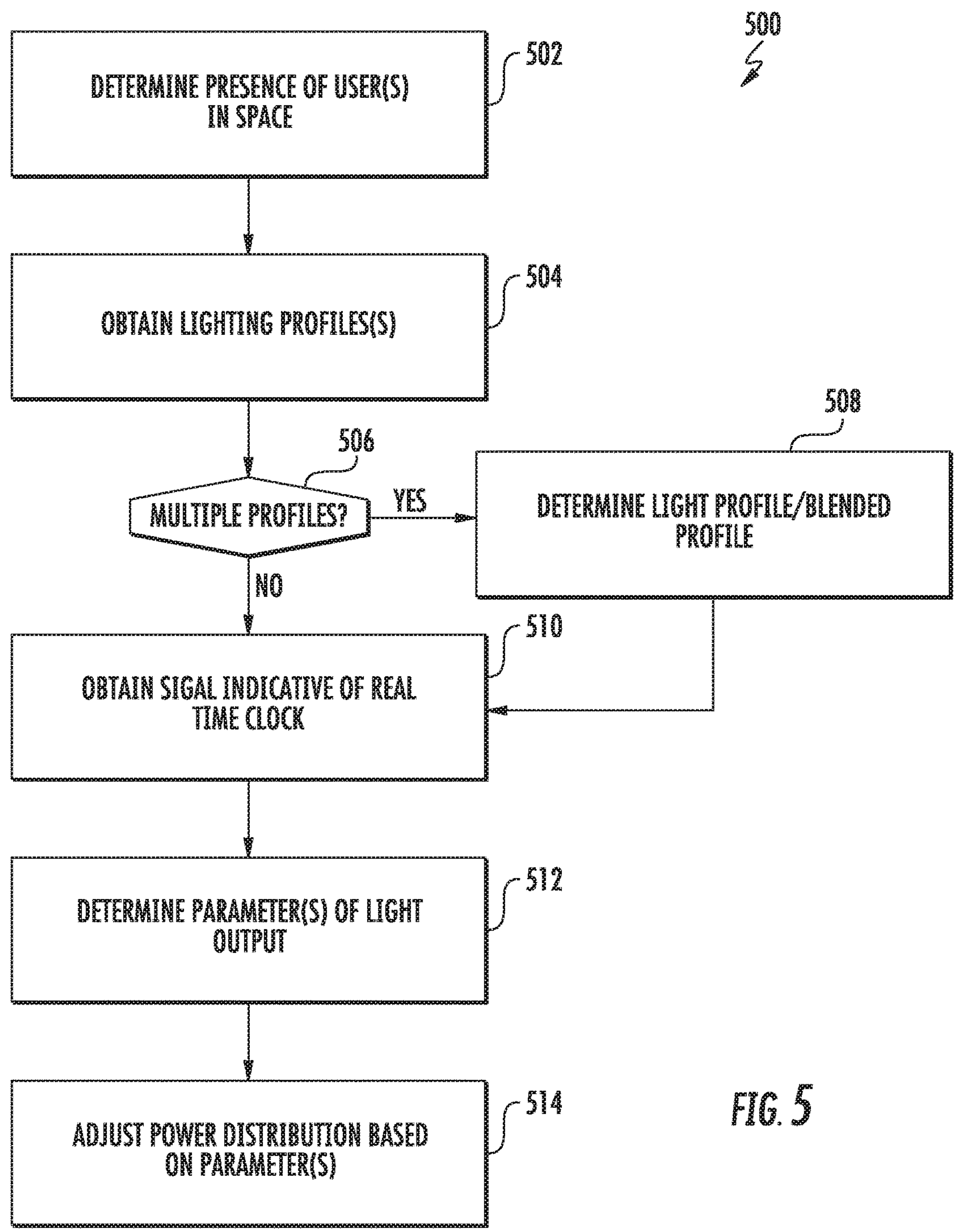
FIG. 5 depicts a flow diagram of an example method according to example embodiments of the present disclosure.

FIG. 5 depicts a flow diagram of an example method (500) according to example embodiments of the present disclosure. The method (500) can be implemented, for instance, using the control device(s) depicted in FIG. 3 or 4. FIG. 5 depicts steps performed in a particular order for purposes of illustration and discussion. Those of ordinary skill in the art, using the disclosures provided herein, will understand that the steps of any of the methods disclosed herein can be adapted, modified, performed simultaneously, omitted, and/or rearranged in various ways without deviating from the scope of the present disclosure.

At (502), the method can include determining the presence of one or more users in or near a space. A user can be detected in a variety of ways. For instance, in some embodiments, a user can be identified to be present when a user device (e.g., smartphone, tablet, wearable device, etc.) initiates communications with a light fixture via a communications medium. In some embodiments, VLC can be used to initiate communications with a user device and receive user identification from the user device. In some embodiments, a sensor (e.g., a motion sensor) can be used to detect the presence of a user. In some embodiments, a user can provide a voice command or other command to indicate the user's presence in or near the space. The light fixture can process the voice command using audio recognition techniques to identify the presence of the user. In some embodiments, motion of the user in the room can be analyzed and processed using a model that correlates motion with individual users (e.g., based on mannerisms, gait, etc.). A machine learning algorithm can be used to develop the motion model to recognize user movements.

Other signals indicative of user presence can be used without deviating from the scope of the present disclosure. For instance, a signal associated with a key FOB reader or other security device can indicate the presence of a particular user. As an example, a user can unlock a room, house, or other space using a key or digital device. Unlocking the room or space can provide a signal indicative of user presence in or near the space. As another example, imagery captured by one or more cameras viewing the space or a region near the space can be processed to identify a user. Predictive user patterns can be used to determine the presence of a user in or near the space.

According to example embodiments of the present disclosure, each user can have one or more associated defined light profiles. The defined light profiles can be present profiles (e.g., designed to match a natural day-to-night cycle) or can be custom profiles based on user preferences. The defined light profiles can specify parameter(s) of light to be provided in the space, such as color temperature and/or intensity, as a function of time (e.g., as a function of a signal indicative of a real time clock).

At (504), the method can include obtaining data indicative of defined light profile associated with the each of the one or more users identified to be present in the space. In some embodiments, the defined light profile can be obtained over a communication medium (e.g., wired or wireless communication medium) from a user device carried by a user into the space (e.g., smartphone, tablet, wearable, etc.). In some embodiments, the data indicative of the light profile associated with the user can be obtained from a server or other remote device storing data indicative of defined light profiles for various users.

At (506), the method can determine whether there are multiple profiles as a result of multiple users being present in the space. If not, the method can continue to (510) to control the light output based on the single defined light profile as discussed below.

If so, the method can select one of the plurality of light profiles or determine a blended profile (508). More particularly, in some embodiments, a priority associated with the defined light profiles can be determined based on a various factors, such as primary occupant, time in the space, seniority, health concerns, etc.). One of the plurality of light profiles can be selected based on the priority. In another embodiment, a blended light profile can be determined based on the plurality of light profiles. For example, in one implementation, a weighted average algorithm can be used to determine a blended profile from the plurality of light profiles. Once determined, the method can continue to (510) to control light output based on the selected light profile or blended light profile.

At (510), the method can include accessing a signal indicative of a real time clock. The signal indicative of the real time clock can be an internal signal to one or more control devices in a light fixture or can be obtained from a remote source via a communication medium.

At (512), the method can include determining one or more parameters of light output based on the light profile and the signal indicative of the real time clock. For instance, in some embodiments, the light profile can be specified as a look up table correlating one or more parameters with time of day as indicated by the real time clock. Using the signal indicative of the real time clock, a control device can look up the one or more parameters corresponding to the time of day in the light profile. The one or more parameters can include color temperature and/or intensity.

At (514), the method can include adjusting a power distribution based on the one or more parameters. For instance, one or more control signals can be provided to a power circuit to adjust driver currents among a plurality of LED arrays so that a light fixture provides light output having the one or more determined parameters.

The present example is discussed with reference to determining one or more parameters from a defined light profile and adjusting a power distribution based on the one or more parameters. Those of ordinary skill in the art, using the disclosures provided herein, will understand that this can include directly determining control signals for adjusting a power distribution among a plurality of light sources using the defined light profile as a combined step without necessarily determining the one or more parameters of the light output.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light fixture, comprising:

a first light emitting diode (LED) array having one or more LED light sources;

a second LED array having one or more LED light sources;

a power circuit configured to provide power to the first LED array and the second LED array according to a power distribution among the first LED array and the second LED array;

one or more control devices, the one or more control devices configured to control the power circuit to adjust the power distribution among the first LED array and the second LED array based at least in part on a signal indicating presence of the user in or near the space, a signal indicative of a real time clock, and a signal indicative of a defined light profile associated with a user present in or near a space illuminated by the light fixture.

2. The light fixture of claim 1, wherein the defined light profile is obtained from a user device used by the user in the space.

3. The light fixture of claim 1, wherein the defined light profile specifies an adjustment in one or more parameters of a light output of the light fixture as a function of time.

4. The light fixture of claim 3, wherein the one or more parameters of the light output comprises a color temperature of the light output.

5. The light fixture of claim 3, wherein the one or more parameters of the light output comprises an intensity of the light output.

6. The light fixture of claim 3, wherein the defined light profile specifies a decrease in the color temperature of the light output over time from a first color temperature to a second color temperature as the signal indicative of the real time clock transitions from a signal associated with an earlier time in the day-to-night period to a signal associated with a later time in the day-to-night period.

7. The light fixture of claim 6, wherein the defined light profile specifies an increase in the color temperature of the light output when the signal indicative of the real time clock indicates a transition from a day portion of the day-to-night period to a night portion of the day-to-night period.

8. The light fixture of claim 1, wherein the defined light profile specifies an adjustment in the light output over time based on calendar data associated with the user.

9. The light fixture of claim 1, wherein the defined light profile specifies an adjustment in the light output over time based at least in part on health data associated with the user.

10. The light fixture of claim 1, wherein the one or more light sources comprise a first LED array having one or more LED devices associated with a first color temperature and a second LED array having one or more LED devices associated with a second color temperature.

11. The light fixture of claim 1, wherein the light fixture is configured to communicate data associated with the defined light profile to one or more remote light fixtures via a communication interface.

12. The light fixture of claim 1, wherein the signal indicative of the real time clock is obtained from a remote device via the communication interface.

13. A method of controlling the light output of a light fixture, the method comprising:

determining, by one or more control devices, the presence of one or more users in or near a space illuminated by the light fixture based on one or more signals indicative of presence of the one or more users in or near the space;

obtaining, by one or more control devices, data associated with a defined light profile associated with each of the one or more users determined to be in or near the space illuminated by the light fixture;

determining, by the one or more control devices, one or more parameters of a light output from the light fixture based at least in part on the data associated with the defined light profile associated with each of the one or more users; and adjusting, by the one or more control devices, a power distribution among the a plurality of light sources in the light fixture based at least in part on the one or more parameters of the light output and one or more signals indicating presence of the user(s) in or near the space.

14. The method of claim 13, wherein obtaining, by the one or more control devices, data associated with a defined light profile comprises obtaining data associated with a first defined light profile associated with a first user and data associated with a second defined light profile associated with a second user.

15. The method of claim 14, wherein determining, by the one or more control devices, one or more parameters of a light output comprises:

determining, by the one or more control devices, a priority associated with the first defined light profile and the second defined light profile; and determining, by the one or more control devices, the one or more parameters based at least in part on the priority.

16. The method of claim 14, wherein determining, by the one or more control devices, one or more parameters of a light output comprises:

determining, by the one or more control devices, a blended light profile based on the first defined light profile and the second defined light profile; and determining, by the one or more control devices, the one or more parameters based at least in part on the blended light profile.

17. The method of claim 13, wherein the data associated with the defined light profile for each of the one or more users identified to be in the space is obtained from a remote device via a communication interface.

18. The method of claim 13, wherein the method further comprises communicating data associated with the power distribution to one or more other light fixtures in the space via a communications interface.

19. A circuit for powering a plurality of light emitting diode (LED) arrays associated with a light fixture, comprising:

a power circuit;

a communication interface; and a control device operable to perform operations, the operations comprising:

obtaining a defined light profile associated with a user in or near the space via the communication interface;

obtaining a signal indicative of a real time clock;

determining from the defined light profile a color temperature and an intensity of a light output based at least in part on the signal indicative of the real time clock; and sending a control signal to the power circuit to control a power distribution among the plurality of LED arrays based at least in part on the determined color temperature and intensity of the light output and one or more signals indicating presence of the user in or near the space.

* * * * *